US006547299B2

(12) United States Patent
Atanasiu et al.

(10) Patent No.: US 6,547,299 B2
(45) Date of Patent: Apr. 15, 2003

(54) REMOVABLE CONSOLE

(75) Inventors: John Atanasiu, Troy, MI (US); Alisha A. Jeanpierre, West Bloomfield, MI (US); Katherine A. Buck, New Boston, MI (US); Keith D. Shivers, Detroit, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/955,669

(22) Filed: Sep. 19, 2001

(65) Prior Publication Data

US 2003/0052500 A1 Mar. 20, 2003

(51) Int. Cl.[7] .......... B60R 7/00

(52) U.S. Cl. .......... 296/24.1; 296/37.8; 296/37.6; 296/37.14; 224/281

(58) Field of Search .......... 296/37.8, 37.6, 296/37.14, 100.03, 100.04, 24.1; 224/403, 404, 281, 310, 321

(56) References Cited

U.S. PATENT DOCUMENTS 2,605,064 A * 7/1952 Davis .......... 105/345
3,177,033 A * 4/1965 Daniels .......... 16/297
3,356,409 A 12/1967 Belsky et al. .......... 296/24.1
4,772,165 A * 9/1988 Bartkus .......... 211/7
4,813,582 A * 3/1989 Henricksen et al. .......... 224/281
5,106,143 A 4/1992 Soeters .......... 296/37.8
5,275,320 A * 1/1994 Duemmler .......... 224/319
5,338,081 A 8/1994 Young et al. .......... 296/37.14
5,419,479 A * 5/1995 Evels et al. .......... 224/309
5,899,544 A * 5/1999 James et al. .......... 108/110
5,924,616 A * 7/1999 Shives .......... 224/281
6,086,129 A 7/2000 Gray .......... 296/37.8
6,116,674 A 9/2000 Allison et al. .......... 296/37.8
6,135,529 A 10/2000 De Angelis et al. .......... 296/37.8
6,203,088 B1 3/2001 Fernandez et al. .......... 296/37.8
6,264,083 B1 * 7/2001 Pavlick et al. .......... 224/281
6,264,261 B1 * 7/2001 Krafcik .......... 296/37.8
2002/0057001 A1 * 5/2002 Wilding .......... 296/37.6

* cited by examiner

*Primary Examiner*—Stephen T. Gordon
*Assistant Examiner*—Patricia L. Engle
(74) *Attorney, Agent, or Firm*—Brinks Hofer Gilson & Lione

(57) ABSTRACT

A removable console system includes a removable console having a front end, a rear end, a first side and a second side. A pair of support rails are adapted to support the removable console and to allow sliding movement of the removable console on the support of rails. The removable console includes support surfaces extending outward from opposing sides of the removable console which are adapted to engage the support rails to support the removable console on the support rails. The removable console further includes at least one latching mechanism for securing the removable console to the support rails.

14 Claims, 3 Drawing Sheets

26d
26a
26b
26c
24
22
16
26
18
20
24
12
14
22
26
10

26d
26a
26b
26c
24
22
26
16
18
20
14
26
10
24
12
22

42
32
28
36
38
22
40
38
36
30
34

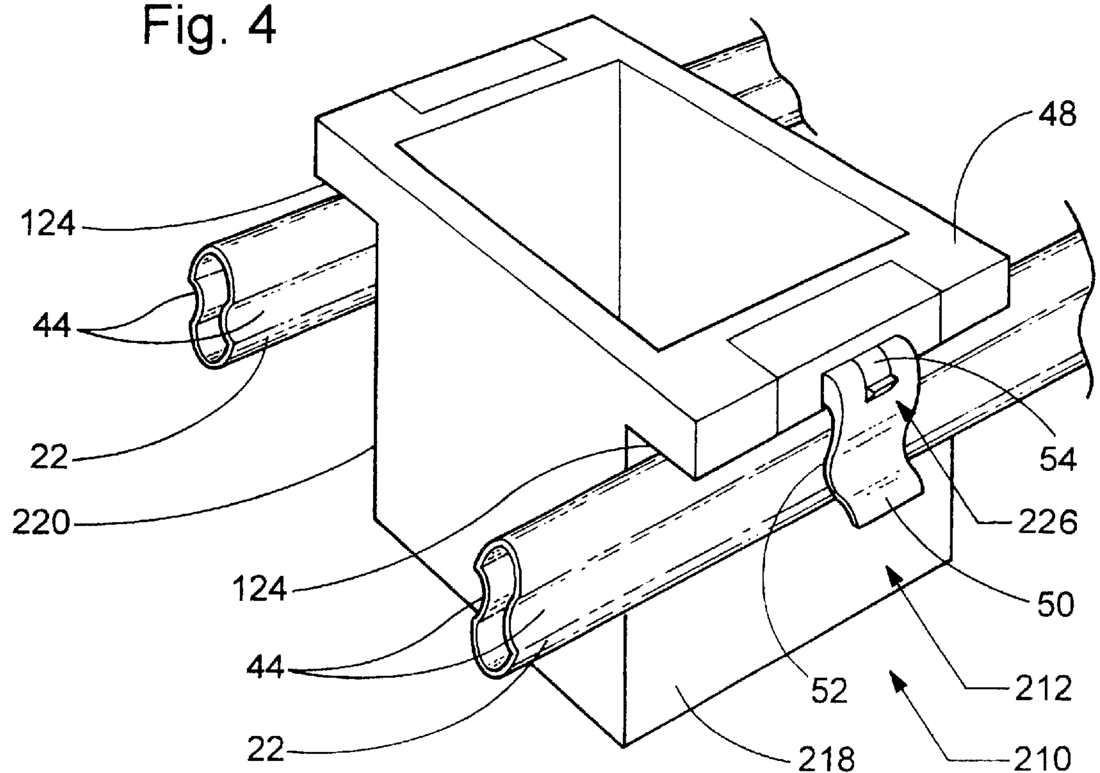
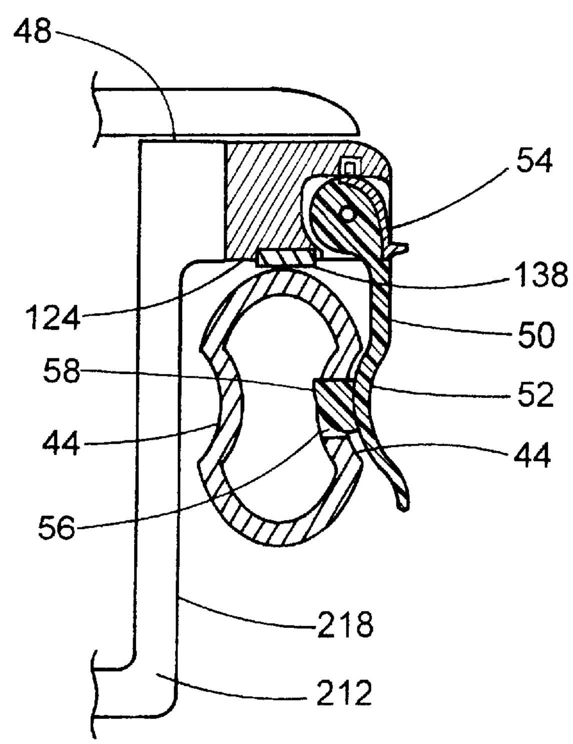
Fig. 5

REMOVABLE CONSOLE

TECHNICAL FIELD OF THE INVENTION

The present invention generally relates to a removable console system, an more specifically to a removable console supported by rails.

BACKGROUND OF THE INVENTION

Various techniques have been developed to allow a console for an automotive vehicle to be moved within the vehicle while maintaining secure mounting within the vehicle under normal driving conditions. However, stability and maintaining a secure mounting is typically sacrificed for providing ease of movement. Therefore, there is a need for an improved removable console system which will allow the console to be easily moved within the vehicle while maintaining a secure mounting to keep the console in position.

BRIEF DESCRIPTION OF THE DRAWINGS

FIG. 4 is a perspective view of a third preferred embodiment; and

FIG. 5 is a partial sectional view of the third preferred embodiment showing a latching mechanism.

DETAILED DESCRIPTION OF THE INVENTION

The following description of the preferred embodiments of the invention is not intended to limit the scope of the invention to these preferred embodiments, but rather to enable any person skilled in the art to make and use the invention.

Figure 1:
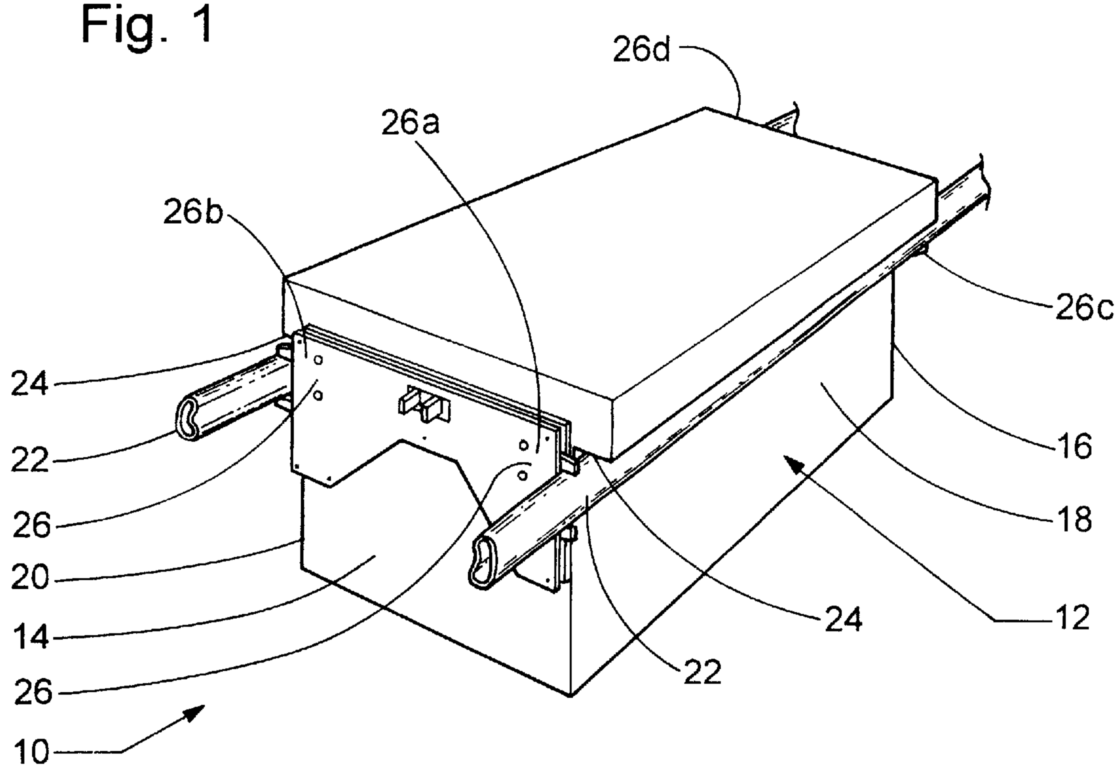
FIG. 1 is a perspective view of a first preferred embodiment of the present invention.

Referring to FIG. 1, a first preferred embodiment of a removable console system of the present invention is shown generally at 10. The removable console system 10 includes a removable console 12 having a front end 14, a rear end 16, a first side 18 and a second side 20. Preferably, the removable console 12 is generally rectangular in shape. The removable console 12 is adapted to be mounted onto a pair of support rails 22. The support rails 22 are adapted to support the removable console 12 therebetween and to allow sliding movement of the removable console 12 along the length of the support of rails 22. Preferably, the support rails 22 are aluminum and are formed by extrusion, however, it is to be understood, that the support rails 22 could be formed by many other methods and could be made from other suitable materials such as steel.

The removable console 12 -can incorporate multiple features. Preferably, the removable console 12 will form a hollow container which is suitable for storing items within a vehicle with a lid attached to the top. The interior of the removable console 12 can incorporate different features such as slots for holding CDs or cassettes, or a coin tray. The lid of the removable console 12 could also include features such as cup holders or recessed trays for holding small items while a vehicle is in motion. The removable console 12 of the present invention will allow a person to remove the console 12 from the vehicle so that a different console with different features can be put in place of the removed console 12.

The removable console 12 includes support surfaces 24 extending outward from opposing sides of the removable console. The support surfaces 24 are adapted to engage the support rails 22 to support the removable console 12 on the support rails 22. Preferably, the support surfaces 24 include a compression pad (not shown). The compression pads are adapted to engage the support rails 22 and to provide increased friction between the removable console 12 and the support rails 22. The compression pads will also provide dampening to the system to reduce rattle between the removable console 12 and the support rails 22.

The removable console 12 further includes at least one latching mechanism 26 which is adapted to secure the removable console 12 to the support rails 22. In the first preferred embodiment, the removable console 12 includes a pair of latching mechanisms 26 which are mounted adjacent the front end 14 of the removable console 12. A first latching mechanism 26*a* extends outward from the first side 18 of the removable console 12 and a second latching mechanism 26*b* extends outward from the second side 20 of the removable console 12. The first embodiment also includes a pair of latching mechanisms 26 mounted adjacent the rear end 16 of the removable console 12 with a third latching mechanism 26*c* extending outward from the first side 18 and a fourth latching mechanism 26*d* extending outward from the second side 20.

Figure 2:
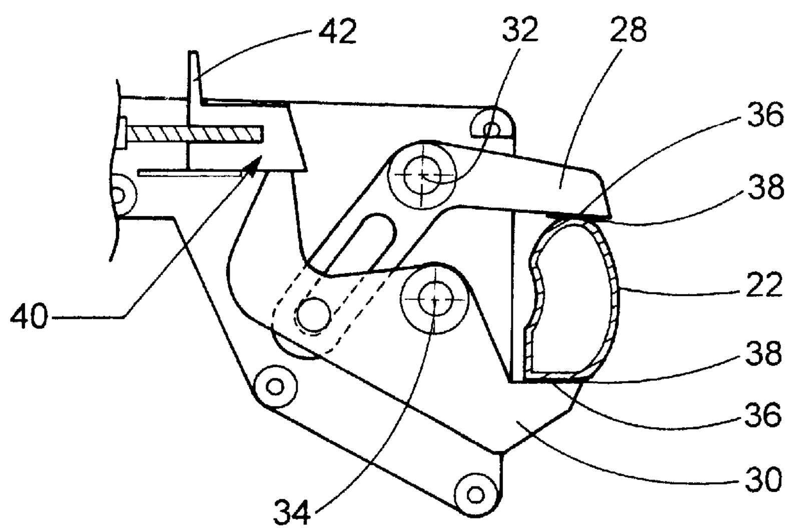
FIG. 2 is a partial end view of the first preferred embodiment showing a latching mechanism.

Each of the latching mechanisms 26*a,* 26*b,* 26*c,* 26*d* of the first preferred embodiment includes a pair of opposable pivoting lever arms 28, 30 as shown in FIG. 2. The lever arms 28, 30 are adapted to secure one of the support rails 22 therebetween, thereby securing the removable console 12 to the support rails 22. Referring to FIG. 2, each latching mechanism 26*a,* 26*b,* 26*c,* 26*d* includes an upper lever arm 28 pivotable about a first pivot point 32 and a lower lever arm 30 pivotable about a second pivot point 34. Each of the upper and lower lever arms 28, 30 includes a contact surface 36 that is adapted to engage the support rails 22 when the removable console 12 is mounted to the support rails 22. In the first preferred embodiment, the support surfaces 24 are defined by the contact surfaces 36 of the lever arms 28, 30. Preferably, each of the lever arms 28, 30 includes a compression pad 38 mounted to the contact surface 36. The compression pads 38 are adapted to engage the support rails 22 and to provide increased friction between the lever arms 28, 30 and the support rails 22. The compression pads 38 will also provide dampening to the system to reduce rattle between the lever arms 28, 30 and the support rails 22.

Preferably, each pair of lever arms 28, 30 includes a manually releasable locking mechanism 40 to prevent the lever arms 28, 30 from pivoting away from one another. The locking mechanism 40 includes a lever 42 which is adapted to allow a person to manually manipulate the locking mechanism 40 to allow the lever arms 28, 30 to pivot away from each other, thereby releasing the grip of the lever arms 28, 30 on the support rails 22 and allowing the removable console 12 to slide along the support rails 22. Further, releasing the lever arms 28, 30 will allow a person to remove the console 12 from the support rails 22. In this way, the console 12 within the vehicle can be interchangeable with other consoles having different features. Preferably, the removable console 12 of the first preferred embodiment is adapted for heavy load applications such as for holding tools or the like. Consequently, the latching mechanisms 26*a,* 26*b,* 26*c,* 26*d* of the first preferred embodiment are robust enough to support such loads.

Figure 3:
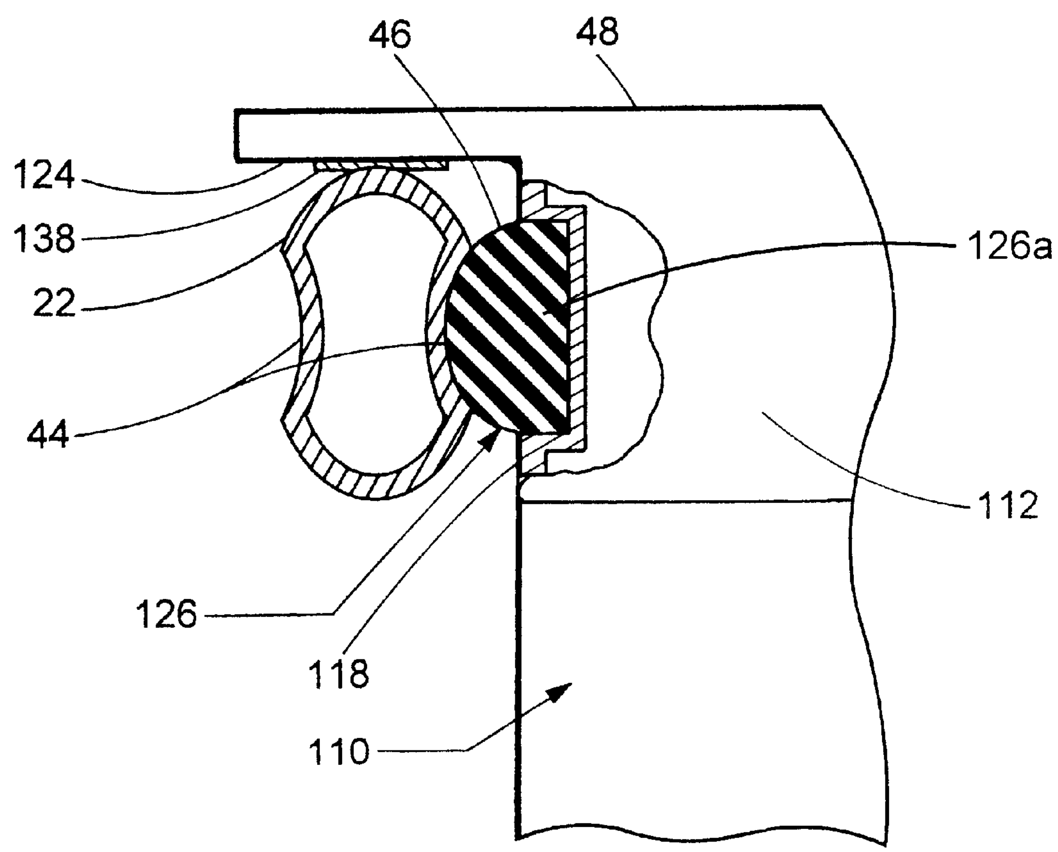
FIG. 3 is partial end view of a second preferred embodiment showing a latching mechanism.

Referring to FIG. 3, a second preferred embodiment of a removable console system of the present invention is shown generally at 110. The second preferred embodiment 110 includes a removable console 112 having a front end (not shown), a rear end (not shown), a first side 118, a second side (not shown), and a pair of latching mechanisms 126 (one shown). Preferably, the removable console 112 of the second embodiment is adapted for light load applications such as a coin tray or cup holder. A first latching mechanism 126*a* extends from the first side 118 and a second latching mechanism (not shown) extends from the second side (not shown).

Each of the support rails 22 includes concave grooves 44 within each side of the support rails 22. As shown, the support rails 22 include grooves 44 on both sides, however, the second preferred embodiment only utilizes the groove 44 on the inboard side. Preferably, the support rails 22 will include grooves 44 on both sides for symmetry and ease of manufacturing. The latching mechanisms 126 include a deformable protrusion 46 which presents a convex shape corresponding to the concave grooves 44. When the removable console 112 is placed on the support rails 22, the deformable protrusions 46 will compress to allow the removable console 112 to fit between the support rails 22. Once the removable console 112 is in place, the deformable protrusions 46 will extend outward into the concave grooves 44 to removably secure the removable console 112 on the support rails 22.

Preferably, the deformable protrusions 46 are sized such that when the removable console 112 is mounted on the support rails 22, the deformable protrusions 46 will be slightly compressed, thereby providing sliding friction between the deformable protrusions 46 and the support rails 22 to maintain the removable console 112 in a position on the support rails 22. Preferably, the deformable protrusions 46 are firm enough to keep the console 12 securely mounted to the support rails 22 under normal driving conditions, but flexible enough to allow a person to remove the console 12 from the support rails 22 under sufficient force so that the console 12 can be completely removed from a vehicle.

The removable console 112 of the second preferred embodiment includes support surfaces 124 extending from a top edge 48 outward from the first side 118 and the second side. Preferably, the support surfaces 124 include compression pads 138 adapted to engage the support rails 22 and to provide increased friction between the removable console 112 and the support rails 22 and to reduce rattle between the removable console 112 and the support rails 22.

The removable console 112 of the second preferred embodiment can be slid along the support rails 22 if a force sufficient to overcome the friction between the support rails 22 and the deformable protrusions 46 is applied to the removable console 112. Preferably, the friction between the deformable protrusions 46 and the support rails 22 is sufficient to keep the removable console 112 in position on the support rails 22 under normal conditions but will allow a person to move the removable console 112 along the support rails 22 under a reasonable amount of force.

Referring to FIGS. 4 and 5, a third preferred embodiment of the removable console system of the present invention is shown generally at 210 and also includes support rails 22 with concave grooves 44 and a latching mechanism 226 extending from the first and second sides 218, 220. The latching mechanisms 226 of the third preferred embodiment 210 include a spring loaded flap 50 which extends downward adjacent the support rails 22. The spring loaded flaps 50 include a convex protrusion 52 corresponding to the concave grooves 44. When the removable console 212 (placed to the support rails 22, the spring loaded flaps 50 will flex outward to allow the removable console 212 to fit between the support rails 22. When the removable console 212 is in place, the spring loaded flaps 50 will spring back and the convex protrusions 52 will fit into the concave grooves 44 to secure the removable console 212 on the support rails 22.

Preferably, the spring loaded flaps 50 are biased by a spring (not shown) such that when the removable console 212 is mounted on the support rails 22, the spring loaded flaps 50 will be biased against the support rails 22 by the spring. The support rails 22 of the third preferred embodiment 210 include a plurality of apertures 56 extending through the sides of the support rails 22 within the concave grooves 44. Additionally, the convex protrusions 52 on the spring loaded flaps 50 include tabs 58 extending inward. The tabs 58 are adapted to be received within the apertures 56 to provide a positive stop to prevent the removable console 212 from sliding along the support rails 22.

The latching mechanisms 226 of the removable console 212 of the third preferred embodiment 210 are preferably adapted to keep the removable console 212 in position on the support rails 22 under normal conditions. In order to move the removable console 212 along the support rails 22, a person must force the spring loaded flap 50 outward away from the support rails 22 against the biasing force of the spring to move the convex protrusion 52 away from the concave grooves 44 within the support rails 22. When the spring loaded flaps 50 are forced outward enough to allow the tabs 58 to clear the apertures 56, the removable console 212 is allowed to move along the support rails 22. When the removable console 212 is moved to the position desired, the spring loaded flaps 50 can be released, wherein the spring will bias the convex protrusions 52 back into the concave grooves 44 within the support rails 22 and the tabs 58 will extend within the apertures 56 within the support rails 22 at that point, thereby securing the removable console 212 at that position.

Preferably, the spring loaded flaps 50 each include a manually releasable locking mechanism 54 to prevent the spring loaded flaps 50 from pivoting away from the support rails 22. The locking mechanism 54 is adapted to allow a person to selectively lock the spring loaded flaps 50 in position to insure that the spring loaded flaps 50 are not inadvertently flexed outward enough to allow the removable console 212 to move along the support rails 22 or to come loose from the support rails 22.

The foregoing discussion discloses and describes three preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. A removable console system for an automotive vehicle comprising:

a removable console having a front end, a rear end, a first side and a second side;

a pair of support rails adapted to support said removable console and to frictionally engage said removable console to maintain the position of said removable console along said support rails under normal operating conditions, and to allow sliding movement of said removable console on said support rails when a sufficient force is exerted upon said removable console;

said removable console including support surfaces extending outward from opposing sides of said removable console and adapted to engage said support rails to support said removable console on said support rails;

said removable console further including at least one latching mechanism for securing said removable console to said support rails.

2. The removable console system of claim 1 wherein said removable console includes a pair of latching mechanisms mounted adjacent said front end with a first latching mechanism extending outward from said first side and a second latching mechanism extending outward from said second side and a pair of latching mechanisms mounted adjacent said rear with a third latching mechanism extending outward from said first side and a fourth latching mechanism extending outward from said second side.

3. The removable console system of claim 2 wherein each of said latching mechanisms includes a pair of opposable pivoting lever arms adapted to secure one of said support rails therebetween.

4. The removable console system of claim 3 wherein each of said pair of lever arms includes a manually releasable locking mechanism to substantially prevent said lever arms from pivoting away from one another.

5. The removable console system of claim 4 wherein each of said pair of lever arms includes an upper lever arm and a lower lever arm.

6. The removable console system of claim 4 wherein each of said support surfaces and said lever arms include a compression pad adapted to engage said support rails and to provide increased friction between said removable console, said lever arms and said support rails.

7. The removable console system of claim 1 wherein said support rails are aluminum.

8. The removable console system of claim 1 wherein said removable console includes a pair of latching mechanisms, a first of said pair of latching mechanisms extending from said first side and a second of said latching mechanisms extending from said second side.

9. The removable console system of claim 8 wherein each of said support rails includes a concave groove extending longitudinally along said support rails and said latching mechanisms include a deformable protrusion presenting a convex shape corresponding to said concave grooves, whereby when said removable console is placed to said support rails, said deformable protrusions will compress to allow said removable console to fit between said support rails and will extend outward into said concave grooves when said removable console is in position to secure said removable console on said support rails.

10. The removable console system of claim 9 wherein said deformable protrusions are sized such that when said removable console is mounted on said support rails, said deformable protrusions will be slightly compressed, thereby providing sliding friction between said deformable protrusions and said support rails to maintain said removable console in a position on said support rails under normal conditions, and allowing said removable console to slide along said support rails under sufficient force.

11. The removable console system of claim 10 wherein said support surfaces include a compression pad adapted to engage said support rails and to provide increased friction between said removable console and said support rails and to reduce rattle between said removable console and said support rails.

12. The removable console system of claim 8 wherein each of said support rails includes concave grooves and said latching mechanisms include a spring loaded flap which includes a convex protrusion corresponding to said concave grooves, such that when said removable console is placed to said support rails, said spring loaded flaps will flex outward to allow said removable console to fit between said support rails and will spring back into said concave grooves when said removable console is in position to secure said removable console on said support rails.

13. The removable console system of claim 12 wherein said support rails include a plurality of apertures extending through the sides of said support rails within said concave grooves and said convex protrusions on said spring loaded flaps include tabs extending inward which are adapted to be received within said apertures to provide a positive stop to prevent said removable console from sliding along said support rails.

14. The removable console system of claim 13 wherein said support surfaces include a compression pad adapted to engage said support rails and to provide increased friction between said removable console and said support rails and to reduce rattle between said removable console and said support rails.

* * * * *